United States Patent [19]
Houle et al.

[11] Patent Number: 5,170,947
[45] Date of Patent: Dec. 15, 1992

[54] SALT AND SAND SPREADER KIT

[75] Inventors: Bertrand Houle; Guy Lamoureux, both of Drummondville, Canada

[73] Assignee: Tenco Machinery Ltd., Canada

[21] Appl. No.: 695,515

[22] Filed: May 3, 1991

[51] Int. Cl.$^5$ .......................... E01C 19/20; B60P 1/16
[52] U.S. Cl. ................................. 239/657; 239/663; 239/672; 414/489
[58] Field of Search ............... 239/650, 657, 663, 672; 414/489, 491

[56] References Cited

U.S. PATENT DOCUMENTS

| | | | |
|---|---|---|---|
| 2,697,609 | 12/1954 | Chase et al. | 239/657 |
| 3,113,784 | 12/1963 | Swenson et al. | 239/672 X |
| 3,559,894 | 2/1971 | Murray et al. | 239/672 |
| 4,767,063 | 8/1988 | Wall et al. | 239/672 |
| 4,995,773 | 2/1991 | Lamoureux et al. | |

FOREIGN PATENT DOCUMENTS 224609 10/1959 Australia ............................ 239/672
1238070 6/1988 Canada .

*Primary Examiner*—Andres Kashnikow
*Assistant Examiner*—William Grant
*Attorney, Agent, or Firm*—Wolf, Greenfield & Sacks

[57] ABSTRACT

A conversion kit for converting a lightweight dump truck into a sand and salt spreader, wherein a compact second dump body is provided which can be inserted in the first dump body. The second dump body has a first sub-frame overlying the floor of the first dump body and a second sub-frame pivotable about a longitudinal axis over the first sub-frame having a side wall along one edge and a conveyor extending along the hinge axis. A first piston and cylinder extends between the edge of the first sub-frame and the upper edge of the side wall of the second sub-frame to initiate the pivoting travel of the second sub-frame. The second piston and cylinder extends between a median point of the first sub-frame and the outer edge of the second sub-frame to continue the pivoting travel of the second sub-frame.

2 Claims, 2 Drawing Sheets

U.S. Patent  Dec. 15, 1992  Sheet 1 of 2  5,170,947
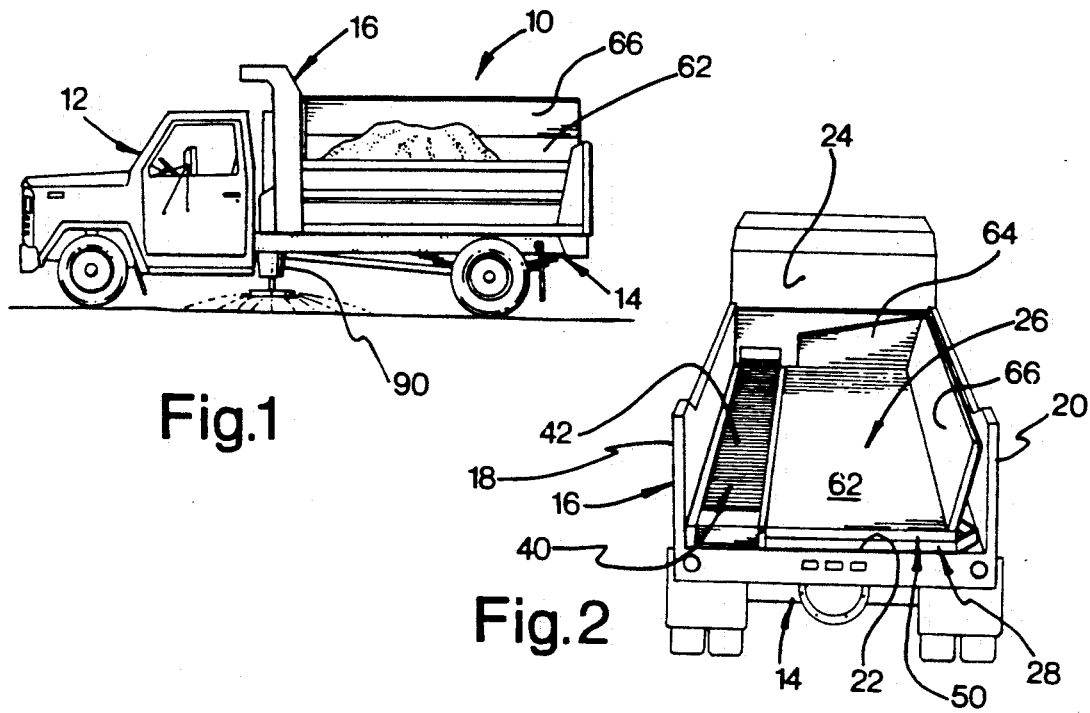
Fig.1
Fig.2
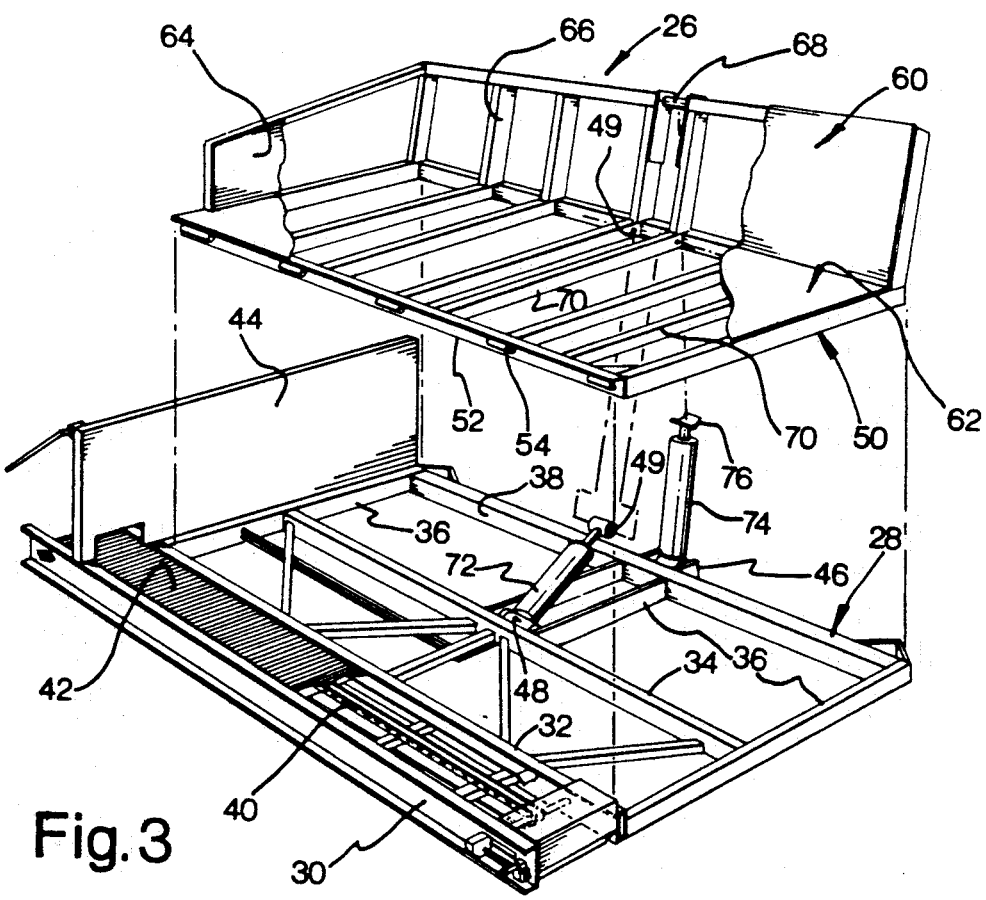
Fig.3

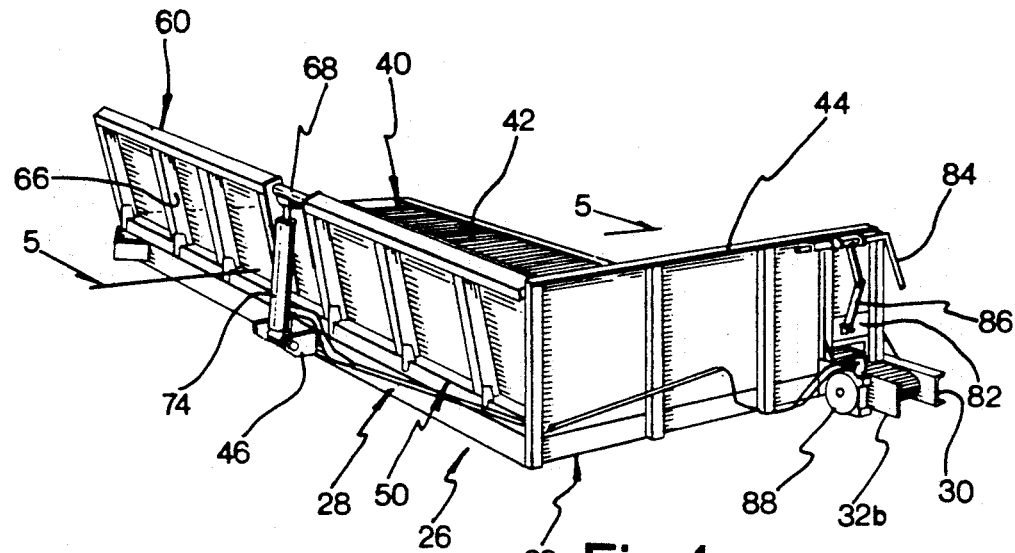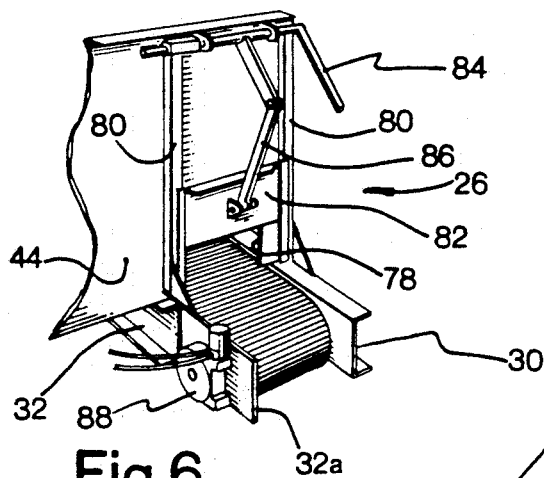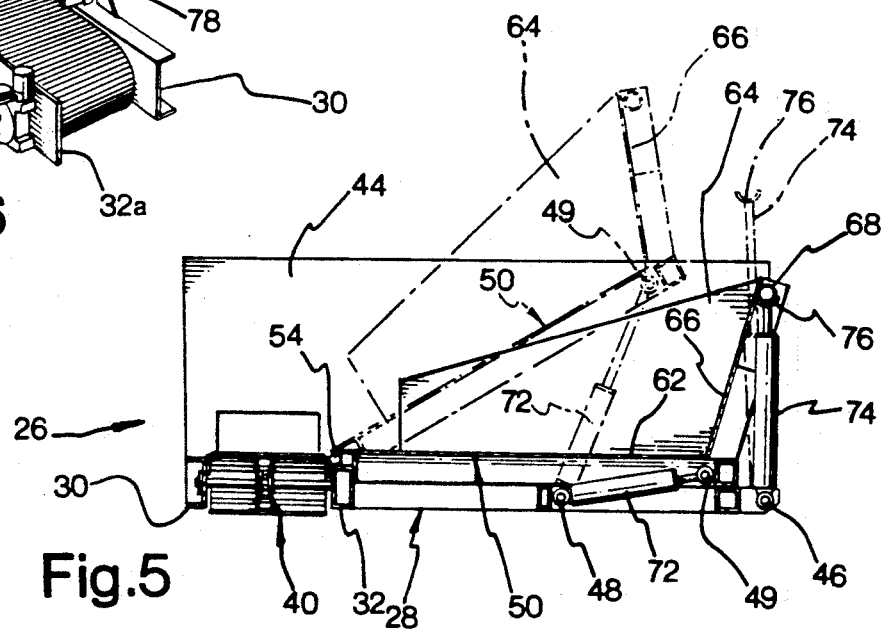

SALT AND SAND SPREADER KIT

BACKGROUND OF THE INVENTION

1. Field of the Invention

The present invention relates to dump truck vehicles, and more particularly, to a kit for converting a lightweight dump truck to a sand-salt spreader.

2. Description of the Prior Art

Dump trucks which have a side dump body portion hinged longitudinally of the dump truck adjacent a conveyor have become increasingly popular. Such sand and salt spreaders are described, for instance, in Canadian Pat. No. 1,238,070, issued Jun. 14, 1988 to Lawrence W. Perry et al, and U.S. Pat. No. 4,995,773, issued Feb. 26, 1991 to Guy Lamoureux et al. This type of dump truck construction is well suited to larger trucks with a specially built dump body. The dump body can be used alternatively as a conventional dump truck or as a sand and salt spreader. In the former configuration, the conveyor is covered with a metal plate which is hinged next to the conveyor on the opposite side to the sand dump portion.

In the light of the particular construction of the dump body described in the above patents, there is a limit to the down-sizing of the dump body construction that can be designed into a relatively small dump truck. For instance, it is difficult to design dump trucks in the order of 1.5 tons or less with such features since the segmented side wall would be quite weak as would the separate sub-frames.

A truck of the type to which the present invention might be directed is typically used for hauling sand or snow and is of the type which would be used by a shopping mall, parking lot, school, or other uses where a large dump truck is not required, and preferably a light truck just slightly greater than a typical pickup truck would be suitable. It is of great advantage that the lightweight dump truck be a multi-purpose vehicle and that it be equipped with a removable salt spreader conversion kit which includes a second dump body which is insertable into the first dump body.

SUMMARY OF THE INVENTION

It is an aim of the present invention to provide a sand and salt spreader kit which will easily convert a smaller dump truck to a sand and salt spreader on a temporary basis.

A further aim of the present invention is to provide a conversion kit for a dump truck which can be easily installed in an existing dump body to convert the dump truck into a sand and salt spreader of the type having a side dumping portion and a conveyor extending longitudinally of the dump body adjacent the side dump portion.

A conversion kit for converting a dump truck vehicle into a sand and salt spreader is provided wherein the dump truck has a dump body mounted on a chassis, the dump body having a front wall, a floor, and side walls. The conversion kit comprises a second dump body insertable in the first dump body and having a first sub-frame overlying the floor of the truck body. The first sub-frame includes at least a pair of beams extending longitudinally of the first sub-frame and to one side thereof, and a conveyor mounted to the beams and co-extensive therewith. A second sub-frame is hingedly mounted about a longitudinal axis to one of the beams of the pair of beams for limited pivotal movement between a first position flat against the first sub-frame and a second position tilted upwardly from the conveyor. A side wall extends from an edge of the second sub-frame parallel to the longitudinal hinge axis and co-extensive and adjacent a correspond-ing side wall of the first dump body when the second dump body is inserted in the first dump body. Motor means are provided for moving the second sub-frame from a first position to a second position.

In a more specific embodiment of the present invention, the motor means includes a first piston and cylinder arrangement extending between a point on the first sub-frame spaced between the conveyor and the outer edge of the first sub-frame and parallel to the conveyor and a second point on the second sub-frame near the side wall thereof and a second piston and cylinder arrangement extending between a point at the outer edge of the first sub-frame and a point on the upper portion of the side wall of the second sub-frame whereby the second piston and cylinder arrangement will be effective to initiate movement of the second sub-frame from the first position towards the second position and the first piston and cylinder arrangement will complete the travel of the second sub-frame to the second position.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a side elevation of a dump truck to which the kit in accordance with the present invention has been installed;

FIG. 2 is a rear elevation of the dump truck shown in FIG. 1 with the dump body partly raised;

FIG. 3 is a perspective exploded view of the conversion kit in accordance with the present invention;

FIG. 4 is a perspective view of the conversion kit taken from a different angle;

FIG. 5 is a vertical cross-section, taken along line 5—5 of FIG. 4; and

FIG. 6 is an enlarged fragmentary perspective view of a detail of the conversion kit shown in FIG. 4.

DESCRIPTION OF THE PREFERRED EMBODIMENTS

Referring now to the drawings, there is shown a dump truck 10 to which the conversion kit of the present invention would be advantageous. The dump truck 10 is a lightweight, i.e., 1½ ton, truck with a cab 12, a chassis 14, and a dump body 16 of the type which can be tilted about a lateral axis for dumping the contents from the dump body 16. It is not required, for the purposes of the present invention, that the dump body be tiltable. The dump truck shown in FIG. 1 is typically used for hauling sand or snow and is of the type which would be used by a shopping mall, parking lot, school, or other uses where a large dump truck is not required, and preferably a light truck just slightly greater than a typical pickup truck would be suitable. It is of great advantage that the lightweight dump truck 10 be a multi-purpose vehicle and that it be equipped with a removable salt spreader conversion kit which includes a second dump body 26 which is insertable into the first dump body 16.

The first dump body 16, which is hinged to the chassis 14, includes side walls 18 and 20, a floor 22, and a front wall 24.

The insertable second dump body 26 is made up of a first sub-frame 28 having elongated longitudinal parallel channel beams 30 and 32. Centrally of the first sub-frame 28 is a longitudinal beam 34, and the other edge of the sub-frame includes a beam 38. A conveyor 40 is provided between beams 30 and 32 and is mounted therebetween with the necessary pulleys and the conveyor belt 42. A front wall 44 is mounted to a front edge of the sub-frame 28. A plurality of lateral frame members 36 and struts would be provided for completing the framing of the sub-frame 28. A bracket 48 mounts a piston and cylinder arrangement 72 which will be discussed later on. The bracket 48 is mounted midway of the sub-frame 28 at one end thereof, as shown in FIG. 3. Likewise, a bracket 46 adapted to pivotally mount the piston and cylinder arrangement 74 is provided outboard of the beam 38 of the sub-frame 28.

A second sub-frame 50 is hingedly mounted to overlie the sub-frame 28. The second sub-frame includes a floor 62, a side wall 60, and a partial front wall 64. The frame of the floor 62 includes longitudinal framing members 52 and a lateral framing member 70. Along the longitudinal framing member 52, hinge brackets 54 are provided to enable the second sub-frame 50 to be hingedly connected to the beam 32 of the first sub-frame 28. In one embodiment of the present invention, the side wall 60 is sloped, as shown in FIGS. 3 and 5, in order to accommodate the piston and cylinder arrangement 74. The side wall 60 includes a bar 68 adapted to be received by the seat 76 on the piston and cylinder arrangement 74.

The other end of the piston and cylinder arrangement 72 is pivotally connected to a bracket 49 which can be a pivot pin extending between a pair of lateral framing members 70 in the floor 62 of the second sub-frame 50.

In operation, the piston and cylinder 74 would initiate the upward pivoting movement of the second sub-frame 50 about the pivot axis 54 so as to move the granulated material, such as salt or sand, onto the conveyor belt 42. Once the piston and cylinder 74 has reached its uppermost extent, the piston and cylinder 72 takes over and continues the travel of the second sub-frame 50 to its uppermost pivoting position, as shown in FIG. 5 in dotted lines.

In view of the compactness of the second dump body 26 which must be inserted into the first dump body 16, a problem existed as to the matter of providing a hydraulic system for pivoting the second sub-frame 50 through its full travel, keeping in mind the limited space for providing such a hydraulic motor.

A hydraulic cylinder 74 mounted to bracket 46 and the bar 68 provides for a limited length of cylinder 74, and thus the extension of the piston and cylinder 74 would be limited.

The piston and cylinder 72 is almost flat with the sub-frame 28 and does not have the proper mechanical leverage to initiate the pivoting movement of the second sub-frame 50. Accordingly, the combination of the two cylinders provides for a first initial travel by cylinder 74 and the take-over by cylinder 72 which, by the time the cylinder and piston 74 are extended, has a better mechanical advantage.

The conversion kit as described so far is a self-contained second dump body 26 which can be placed in a conventional dump body 16 of a truck 10, as shown in FIGS. 1 and 2. The salt spreader unit could be off the rear end of the dump body. The first dump body 16 can accommodate through the floor thereof, or the front end thereof, a discharge and salt or sand distributor 90. In the latter case, the conversion kit including the truck body 26 would be provided with an opening 78, as shown in FIG. 6. The beam 30 would extend forwardly of the second truck body 26, and an extension 32a can be provided on the end of the beam 32. Thus, the conveyor belt 42 extends beyond the front edge of the dump body 26, and the discharge could be arranged to be over an opening in the floor of the conventional dump body 16 and onto a centri-fugal spreader 90.

The front wall of the first dump body 16 could alternatively have an opening in order to allow the conveyor 40 to extend forwardly thereof, and the spreader 90 could be provided in the forward part of the chassis 14.

In one embodiment as shown in FIG. 6, the opening 78 can be closed by means of a gate 82 sliding in tracks 80 and actuated by the arm 84 which is connected thereto by linkage 86.

As shown in FIG. 6, the conveyor belt 42 is driven by a hydraulic motor 88.

As can be seen, the second truck body 26 can easily be loaded onto an existing dump body 16 of a lightweight truck 10 in order to convert the truck into a salt or sand spreader and, in fact, the truck can continue to be used as a general granular material carrier but with a slightly smaller load capacity. After the winter season, or even at intermittent periods, the second body 26 can be removed so that the truck 10 retains its conventional configuration. The second body 26 is completely self-contained with the conveyor, etc., thus making it easily removable or insertable into the dump body.

We claim:

1. A conversion kit for converting a dump truck vehicle into a sand and salt spreader, wherein the dump truck has a first dump body mounted on a chassis, the first dump body having a front wall, a floor, and side walls, the conversion kit comprising a second dump body insertable in the first dump body and having a first sub-frame adapted to lie on the floor of the first dump body, the first sub-frame including a pair of beams extending longitudinally of the first sub-frame and to one side thereof, and a conveyor mounted to the pair of beams and co-extensive therebetween; the second dump body including a second sub-frame hingedly mounted about a longitudinal axis to one of the beams of the pair of beams for limited pivotal movement between a first position flat against the first sub-frame and a second position tilted upwardly from the conveyor, the second sub-frame including a side wall extending from an edge of the second sub-frame parallel to the longitudinal hinge axis and the side wall of the second sub-frame is co-extensive and adjacent a corresponding side wall of the first dump body when the second dump body is inserted in the first dump body; a first piston and cylinder arrangement extending between a point on the first sub-frame spaced between the conveyor and an outer edge of the first sub-frame and a second point on the second sub-frame near the side wall thereof and at least a second piston and cylinder arrangement extending between a point at the outer edge of the first sub-frame and a point on an upper portion of the side wall of the second sub-frame whereby the second piston and cylinder arrangement will be effective to initiate movement of the second sub-frame from the first position towards the second position and the first piston and cylinder arrangement will complete the travel of the second sub-frame to the second position, in order to allow material carried thereof to be moved towards the conveyor.

2. A sand and salt spreader conversion kit as defined in claim 1, wherein the front wall of the first dump body is provided with an opening whereby the conveyor extends through and beyond the front wall to allow discharge of the salt and sand material from the conveyor onto a spreader mounted to the chassis of the truck on which the conversion kit is mounted.

* * * * *